Dec. 19, 1961          J. E. KRYNSKI                3,013,666
                         FILTER
Filed July 11, 1960                            3 Sheets-Sheet 1

INVENTOR
JOHN E KRYNSKI
BY
Robertson & Smythe
ATTORNEYS

Dec. 19, 1961 J. E. KRYNSKI 3,013,666
FILTER
Filed July 11, 1960 3 Sheets-Sheet 2

INVENTOR
JOHN E. KRYNSKI
BY
Robertson & Smythe
ATTORNEYS

Dec. 19, 1961  J. E. KRYNSKI  3,013,666
FILTER

Filed July 11, 1960  3 Sheets-Sheet 3

INVENTOR
JOHN E. KRYNSKI
BY
Robertson & Smythe
ATTORNEYS

United States Patent Office 3,013,666
Patented Dec. 19, 1961

3,013,666
FILTER
John E. Krynski, East Moline, Ill., assignor to American Machine and Metals, Inc., New York, N.Y., a corporation of Delaware
Filed July 11, 1960, Ser. No. 41,976
15 Claims. (Cl. 210—404)

The present invention relates to drum type filters, and particularly to a new and improved drum type filter for use in industrial processes where metal may adversely affect the filtrate, or the nature of the slurry being filtered may corrode any metal coming in contact with it.

An important object of the invention is to provide a drum type filter in which all of the parts exposed to the slurry and filtrate are made from an inert material such as a plastic.

Another object of the invention is to provide such a filter in which the drum unit thereof comprises two molded plastic parts surrounded by grid-like segments for supporting screen and cloth filtering media.

Still another object of the invention is to provide such a drum type filter having molded segmental plastic grids with transverse drainage passages therethrough which lead to sector-shaped passages, at the apexes of which are connected plastic tubes through which the filtrate passes to an exhaust valve.

In one aspect of the invention, a drum type filter may comprise a drum composed of two complementary halves, each of which may include a hollow cylindrical portion closed at one end thereof by a disk on the outer surface of which may be provided radial ribs defining triangular or sector-shaped pockets or recesses therebetween. The disk may have a central hub portion for mounting the drum on a driving shaft. The halves may be made from an inert material and preferably from a plastic such as fiber glass or epoxy-reinforced laminate that is capable of being molded.

In another aspect of the invention, the two complementary halves may be cemented or heat sealed together with the ribs on the separate disks in contact with each other, forming a cylindrical drum having a peripheral surface that leads to the sector-shaped recesses formed between the ribs on the disks. Between each rib of one of said halves, adjacent and surrounding its hub, may be provided a circularly arranged series of holes. A plastic tube may be connected to, and supported by, each of these holes at one end, and the other end of each plastic tube may be mounted within one of a circularly arranged series of holes within a cylindrical boss that may be keyed to the drum driving shaft and journaled in a bearing within a standard.

In still another aspect of the invention, a stationary valve plate that mates with the end of the cylindrical boss may have a number of axial passages therethrough that are arranged about a circle having the same diameter as the circularly arranged plastic tubes. An appropriate number of the axial passages may be connected to a negative pressure producing device so that when each sector-shaped recess is submerged within a tank of slurry, the slurry will be sucked through the sector-shaped recesses, thence through their corresponding plastic tubes, through the valve to a point of collection of the filtrate. The other axial passages of the valve may be open to atmosphere or even a slight positive pressure as is well known in the art.

In still another aspect of the invention, a series of arcuately formed members may extend about the peripheral surface of the drum and these members may include outwardly disposed, axially extending grids, and an inwardly disposed peripheral flange forming with the peripheral surface of the drum, collecting pockets. The longitudinal flanges may be arranged to rest on one half of each of the ribs forming the sector-shaped recesses in the disks at the longitudinal center of the drum. These arcuately formed members may also be molded from fiber glass or an epoxy-reinforced laminate and may be cemented by an epoxy cement or heat sealed to the drum periphery.

In still another aspect of the invention, the abutting edges of adjacent arcuate grid members may be formed to provide caulking grooves, and the axial extremities of said members may form caulking grooves with flanges at each end of the assembled drum. The construction forms a separate, individual collecting pocket for each sector-shaped collecting chamber about the drum.

In still another aspect of the invention, screen and/or cloth filtering media may surround the drum resting on, and held in place by, the grid formation of the arcuately formed grid members.

The above, other objects and novel features of the invention will become apparent from the following specification and accompanying drawings which are merely exemplary.

Figure 1:
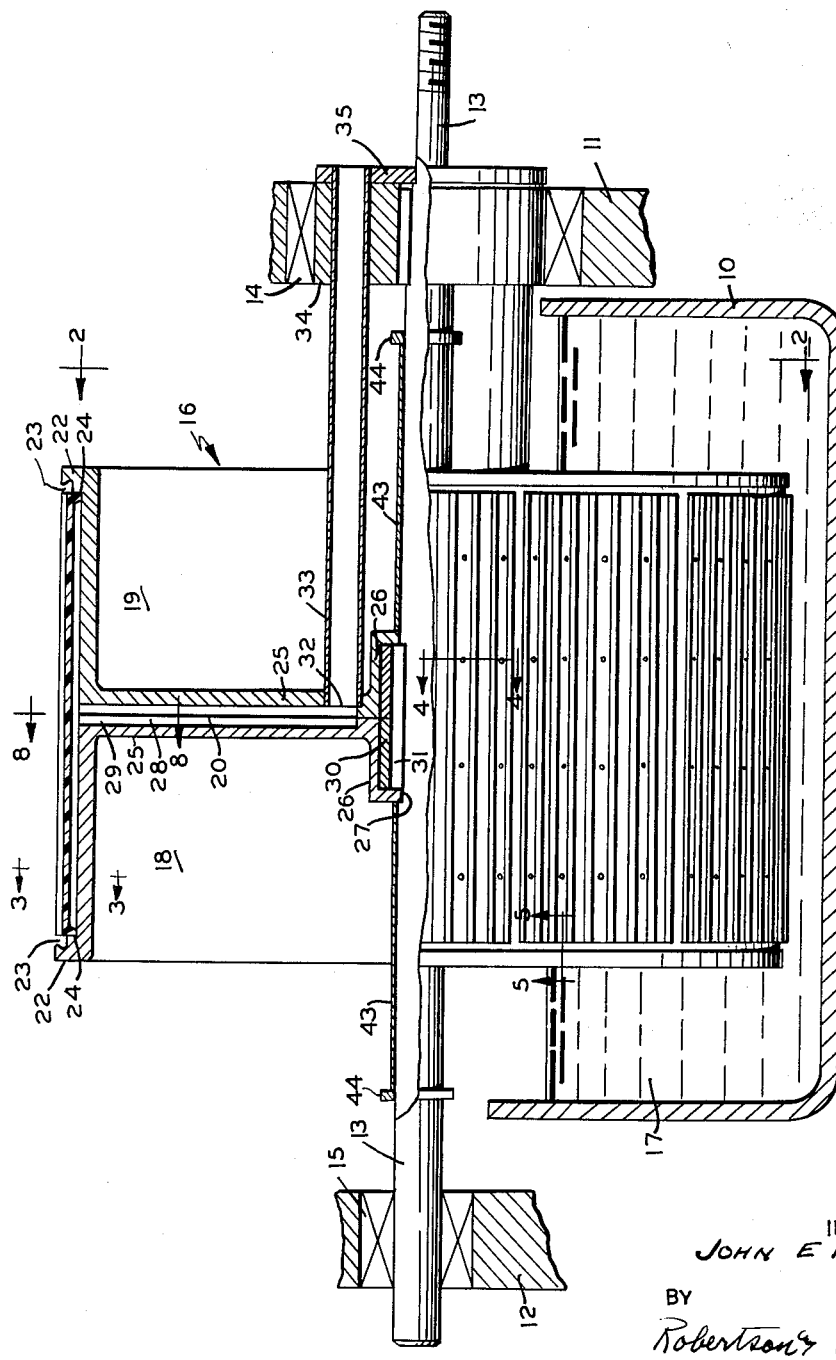
FIG. 1 is a partial sectional elevational view of a drum filter to which the principles of the invention have been applied.
Figure 2:
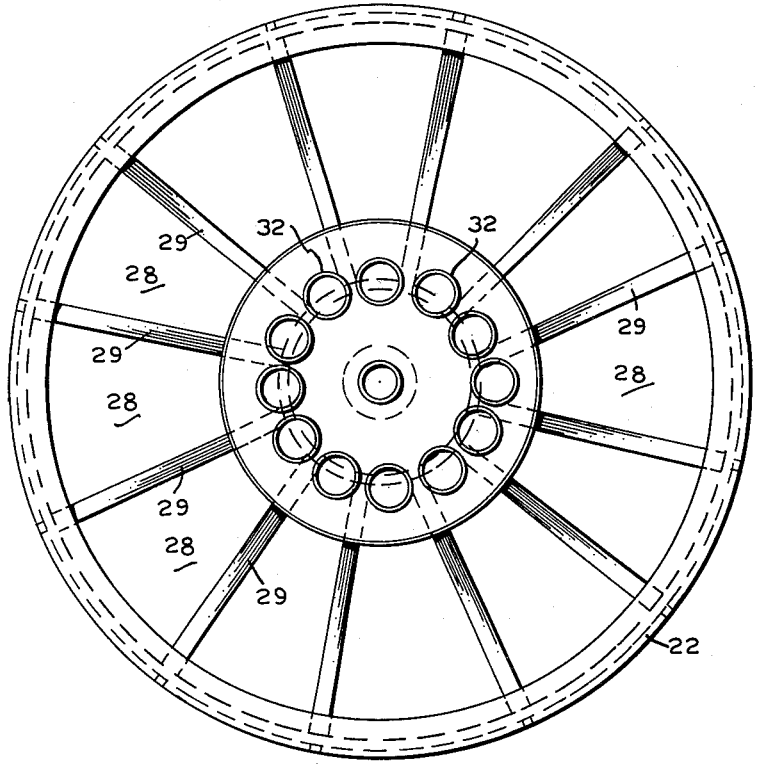
FIG. 2 is an end view of the drum of FIG. 1 as viewed along line 2—2 of FIG. 1.

Referring to the drawings, and particularly to FIG. 1, the principles of the invention are shown as applied to a drum filter including an open upper end tank 10 adapted to contain the slurry to be filtered. Standards 11 and 12 may support a driving shaft 13 by bearings 14 and 15. A drum filter 16 may be mounted on shaft 13 with substantially half of it submerged within a slurry 17 within tank 10.

Figure 6:
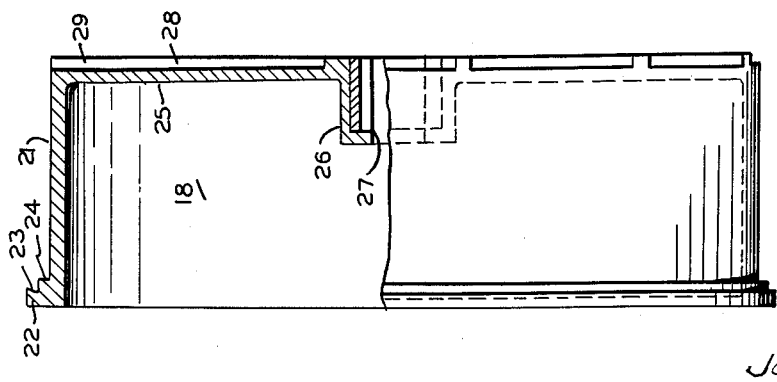
FIG. 6 is a sectional elevational view of one of the halves of the drum shown in FIG. 1.

The drum 16 may comprise two complementary halves 18 and 19. The halves 18 and 19 may be molded fiber glass or epoxy-reinforced laminate which may be cemented along a parting line 20 with an epoxy cement or they may be otherwise fastened. Referring to FIG. 6, the half 18 may comprise a cylindrical member having a peripheral surface 21, at one end of which a peripheral flange 22 may be formed. The flange 22 may include a re-entrant groove 23 forming a stepped ring 24 for a purpose to be described later. The opposite end of cylindrical member 18 may be closed by a disk 25 that includes a centrally disposed hub element 26, having a central hole 27 for receiving the shaft 13.

The exterior surface of disk 25 may be provided with sector-shaped recesses 28 therearound, and in the embodiment disclosed there are shown twelve such recesses between twelve radially disposed ribs 29. A bushing 30, which may be made of metal or may be omitted if the wall of the hub 26 is thick enough, may be cemented to the interior of the hub 26 for receiving a key 31 that fixes the cylindrical member 18 to shaft 13.

The cylindrical member 19 is substantially identical to that of member 18, and the two are cemented together along the parting line 20 by an epoxy cement, or otherwise hermetically sealed along such line, with the corresponding ribs 29 of each member 18 and 19 in contact and forming separate sector-shaped pockets, the apex angles of which are 30° in the embodiment shown.

The disk 25 of the member 19 may be provided with a circularly arranged series of holes 32 adjacent to, and surrounding the hub 26 of the member 19. These holes 32 may be located at the apex of each sector-shaped recess 28 of the member 19.

A plastic tube 33 may be cemented to the disk 25 of member 19 within each hole 32 and they all may extend axially beyond the tank 10 through a valve hub 34 that is keyed to shaft 13 and may be cemented into a terminal plate 35. A manifold valve (not shown) may be connected to the valve hub 34 and said valve may be connected to a negative pressure producing device (not shown) for applying negative pressure to those tubes 33 of the corresponding sector-shaped pockets formed by the recesses 28 that are submerged within the slurry 17, as is well known in the art.

Figure 7:
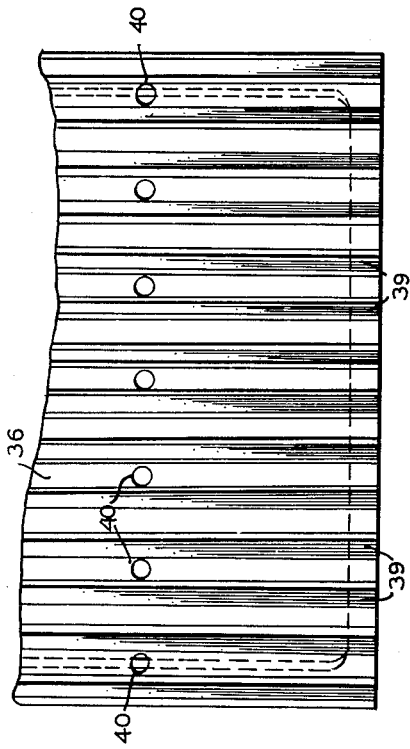
FIG. 7 is an enlarged view of part of one of the grid members of the invention.
Figure 8:
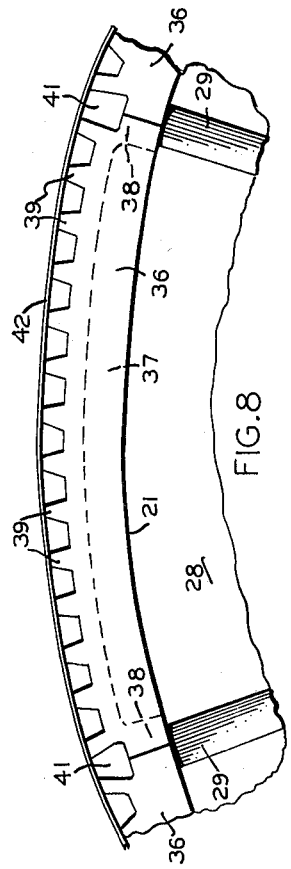
FIG. 8 is an end view of the grid member shown in FIG. 7.

Referring to FIGS. 7 and 8, arcuately shaped members 36 may be arranged around the peripheral surface 21 of the cylindrical members 18 and 19, and they may extend between the flanges 22 of said cylindrical members. The members 36 may be molded from a plastic such as fiber glass or epoxy-impregnated laminate. The members 36 may include a recess 37 on their concave side with a flange or border 38 surrounding all four sides thereof. They may be held in abutting relation to each other about the surface 21 by an epoxy cement or the like between the abutting edges and between the surface 21 and the borders 38.

The convex face of the members 36 may be provided with longitudinally extending teeth 39 forming a grid-like surface. Drainage holes 40 may extend through the members 36 from the bottom of the grooves formed by the teeth 39.

From the foregoing it is evident that the members 36 form separate drainage pockets with the surface 21 of the members 18 and 19, each of which leads to a centrally disposed sector-shaped pocket formed by the recesses 28, from which the filtrate passes through a tube 33 to the negative pressure valve (not shown) that cooperates with the terminal plate 35. Referring again to FIGS. 7, 8 and 3, the abutting ends of members 36 form longitudinally extending caulking grooves 41.

Figure 3:
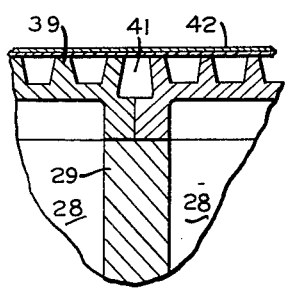
FIG. 3 is a sectional view taken along line 3—3 of FIG. 1.
Figure 4:
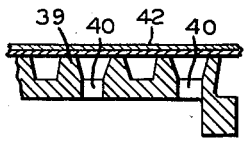
FIG. 4 is a sectional elevational view taken substantially along line 4—4 of FIG. 1.
Figure 5:
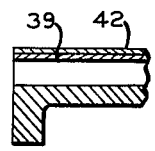
FIG. 5 is a sectional view taken substantially along line 5—5 of FIG. 1.

Referring to FIGS. 3 and 8, screen and/or cloth filtering media 42 may surround the drum 16 resting on the tops of the teeth 39. Caulking material and the filter media 42 may be forced into the caulking grooves 41, thereby securing the filtering media to the drum. Additionally, and referring to FIG. 1, the ends of the members 36 form peripheral caulking grooves with the re-entrant groove 23 on the flanges 22 of the cylindrical members 18 and 19. Caulking material and the filtering media may also be forced into these peripheral caulking grooves to complete the assembly of the filtering media to the drum.

Referring again to FIG. 1, a sleeve 43 may surround shaft 13 and extend from the hubs 26 outwardly of the drum 16. The sleeve 43 also may be made of fiber glass or epoxy-reinforced laminate, and each sleeve may be provided with a drip ring 44 within the confines of tank 10.

Although the various features of the drum type filter have been shown and described in detail to fully disclose one embodiment of the invention, it will be evident that changes may be made in such details and certain features may be used without others without departing from the principles of the invention.

What is claimed is:

1. In a drum type filter, a drum composed of complementary molded plastic half portions of cylindrical form, cemented together along a parting line, a wall on one end of each half portion, said walls being in abutment with each other and having sector-shaped recesses therein which form separate collecting pockets for filtrate, and hub portions; means for keying said hub portions to a driving shaft; plastic tubes leading from each of said collecting pockets; molded plastic grid-like arcuately formed members surrounding the outer peripheral surface of said drum and cemented thereto, said members being arranged in abutting relation about said drum periphery and forming caulking grooves therebetween; filter media surrounding said drum, and resting on said grid-like members; and apertures extending through said grid-like members leading to said sector-shaped collecting pockets.

2. In a drum filter, a drum composed of complementary molded plastic half portions of cylindrical form having abutting disks at one end of each half portion and peripheral flanges at the other end of each half portion; means for mounting said half portions on a driving shaft with said disks in abutting relation; radially disposed ribs on one disk in contact with corresponding ribs on the other disk, thereby forming separate sector-shaped collecting pockets between said disks; plastic tubes leading from each of said collecting pockets; molded plastic grid-like arcuately formed members surrounding the outer peripheral surface of said drum and cemented thereto, said members being arranged in abutting relation about said drum periphery and forming caulking grooves therebetween, the ends of said arcuately formed members forming caulking grooves with said flanges; filter media surrounding said drum, and resting on said grid-like members; and apertures extending through said grid-like members leading to said sector-shaped collecting pockets.

3. In a drum filter, a drum composed of complementary molded plastic half portions of cylindrical form having abutting disks at one end of each half portion and peripheral flanges at the other end of each half portion; means for mounting said half portions on a driving shaft with said disks in abutting relation; radially disposed ribs on one disk in contact with corresponding ribs on the other disk, thereby forming separate sector-shaped collecting pockets between said disks; plastic tubes connected to one of said disks at the apex of each sector-shaped collecting pocket; molded plastic grid-like arcuately formed members surrounding the outer peripheral surface of said drum and cemented thereto, said members being arranged in abutting relation about said drum periphery and forming caulking grooves therebetween; filter media surrounding said drum, and resting on said grid-like members; and apertures extending through said grid-like members leading to said sector-shaped collecting pockets.

4. In a drum type filter, a drum composed of complementary molded plastic half portions of cylindrical form, cemented together along a parting line, a wall on one end of each half portion, said walls being in abutment with each other and having sector-shaped recesses therein which form separate collecting pockets for filtrate, and hub portions; means for keying said hub portions to a driving shaft; plastic sleeve means covering said drive shaft from said hub portions to a point beyond the confines of said drum; drip rings on said sleeve exteriorly of said drum; plastic tubes leading from each of said collecting pockets; molded plastic grid-like arcuately formed members surrounding the outer peripheral surface of said drum and cemented thereto, said members being arranged in abutting relation about said drum periphery and forming caulking grooves therebetween; filter media surrounding said drum, and resting in said grid-like members; and apertures extending through said grid-like members leading to said sector-shaped collecting pockets.

5. In a drum filter, a drum composed of complementary half portions of cylindrical form; means for holding said half portions together along a parting line, a wall on one end of each half portion, said walls being in abutment with each other and having sector-shaped recesses therein which form separate collecting pockets for filtrate;

hub portions connected to each half portion; means for keying said hub portions to a driving shaft; tubular means leading from each of said collecting pockets; grid-like arcuately formed members surrounding the outer peripheral surface of said drum and rigidly attached thereto in abutting relation forming longitudinally extending caulking grooves therebetween; filter media surrounding said drum, and resting on said grid-like members; and apertures extending through said grid-like members leading to said sector-shaped collecting pockets.

6. In a drum filter, a drum composed of complementary half portions of cylindrical form having flanges at the one ends thereof; means for holding said half portions together along a parting line, a wall on one end of each half portion, said walls being in abutment with each other and having sector-shaped recesses therein which form separate collecting pockets for filtrate; hub portions connected to each half portion; means for keying said hub portions to a driving shaft; tubular means leading from each of said collecting pockets; grid-like arcuately formed members surrounding the outer peripheral surface of said drum and rigidly attached thereto in abutting relation forming longitudinally extending caulking grooves therebetween, and the ends of said grid-like members forming peripheral caulking grooves with said flanges; filter media surrounding said drum, and resting on said grid-like members; and apertures extending through said grid-like members leading to said sector-shaped collecting pockets.

7. In a drum filter, a drum composed of complementary half portions of cylindrical form; means for holding said half portions together along a parting line, a wall on one end of each half portion, said walls being in abutment with each other and having sector-shaped recesses therein which form separate collecting pockets for filtrate; hub portions connected to each half portion; means for keying said hub portions to a driving shaft; tubular means leading from each of said collecting pockets; grid-like arcuately formed members surrounding the outer peripheral surface of said drum and rigidly attached thereto in abutting relation forming longitudinally extending caulking grooves therebetween; filter media surrounding said drum, and resting on said grid-like members; and apertures extending through said grid-like members leading to said sector-shaped collecting pockets.

8. In a drum filter, a drum composed of complementary half portions of cylindrical form having flanges at the one ends thereof; means for holding said half portions together along a parting line, a wall on one end of each half portion, said walls being in abutment with each other and having sector-shaped recesses therein which form separate collecting pockets for filtrate; hub portions connected to each half portion; means for keying said hub portions to a driving shaft; tubular means leading from each of said collecting pockets; grid-like arcuately formed members surrounding the outer peripheral surface of said drum and rigidly attached thereto in abutting relation forming longitudinally extending caulking grooves therebetween, and the ends of said grid-like members forming peripheral caulking grooves with said flanges; filter media surrounding said drum, and resting on said grid-like members; and apertures extending through said grid-like members leading to said sector-shaped collecting pockets.

9. In a drum type filter, a drum composed of complementary molded plastic half portions of cylindrical form, cemented together along a parting line, a wall on one end of each half portion, said walls being in abutment with each other and having sector-shaped recesses therein which form separate collecting pockets for filtrate, and hub portions; means for keying said hub portions to a driving shaft; plastic tubes leading from each of said collecting pockets; molded plastic grid-like arcuately formed members surrounding the outer peripheral surface of said drum and cemented thereto, said members being arranged in abutting relation about said drum periphery and forming caulking grooves therebetween; filter media surrounding said drum, and resting on said grid-like members; and apertures extending through said grid-like members leading to said sector-shaped collecting pockets.

10. In a drum filter, a drum composed of complementary molded plastic half portions having abutting disks at one end of each half portion and peripheral flanges at the other end of each half portion; means for mounting said half portions on a driving shaft with said disks in abutting relation; radially disposed ribs on one disk in contact with corresponding ribs on the other disk, thereby forming separate sector-shaped collecting pockets between said disks; plastic tubes leading from each of said collecting pockets; molded plastic grid-like arcuately formed members surrounding the outer peripheral surface of said drum and cemented thereto, said members being arranged in abutting relation about said drum periphery and forming caulking grooves therebetween, the ends of said arcuately formed members forming caulking grooves with said flanges; filter media surrounding said drum, and resting on said grid-like members; and apertures extending through said grid-like members leading to said sector-shaped collecting pockets.

11. In a drum type filter, a drum composed of complementary molded plastic half portions of cylindrical form, cemented together along a parting line, a wall on one end of each half portion, and said walls being in abutment with each other and having sector-shaped recesses therein which form separate collecting pockets for filtrate, and hub portions; means for keying said hub portions to a driving shaft; plastic tubes leading from each of said collecting pockets; molded plastic arcuately formed members surrounding the outer periphery of said drum, each arcuately formed member including a recess on its concave face surrounded by a flanged border, and longitudinally extending teeth on its convex face forming a grid-like structure, said arcuately formed members being arranged and cemented to said drum periphery in abutting relation and forming caulking grooves therebetween; filter media surrounding said drum, and resting on said grid-like members; and apertures extending through said grid-like members leading to said sector-shaped collecting pockets.

12. In a drum type filter, a drum composed of complementary molded epoxy-reinforced laminate half portions of cylindrical form, cemented together along a parting line, a wall on one end of each half portion, said walls being in abutment with each other and having sector-shaped recesses therein which form separate collecting pockets for filtrate, and hub portions; means for keying said hub portions to a driving shaft; epoxy-reinforced laminate tubes leading from each of said collecting pockets; molded epoxy-reinforced laminate grid-like arcuately formed members surrounding the outer peripheral surface of said drum and cemented thereto, said members being arranged in abutting relation about said drum periphery and forming caulking grooves therebetween; filter media surrounding said drum, and resting on said grid-like members; and apertures extending through said grid-like members leading to said sector-shaped collecting pockets.

13. In a drum filter, a drum composed of complementary molded epoxy-reinforced laminate half portions of cylindrical form having abutting disks at one end of each half portion and peripheral flanges at the other end of each half portion; means for mounting said half portions on a driving shaft with said disks in abutting relation; radially disposed ribs on one disk in contact with corresponding ribs on the other disk, thereby forming separate sector-shaped collecting pockets between said disks; epoxy-reinforced laminate tubes leading from each of said collecting pockets; molded epoxy-reinforced laminate grid-like arcuately formed members surrounding the outer peripheral surface of said drum and cemented thereto, said members being arranged in abutting relation about said drum periphery and forming caulking grooves therebetween, the ends of said arcuately formed members forming caulking grooves with said flanges; filter media surrounding said drum, and resting on said grid-like members; and apertures extending through said grid-like members leading to said sector-shaped collecting pockets.

14. As an article of manufacture, a molded plastic drum element for a drum filter comprising a cylindrical wall having a peripheral flange at one end and closed by a circular disk at the other end; a central hub portion on said disk having an opening therethrough for the reception of a driving shaft; radially disposed ribs on the outer face of said disk forming sector-shaped recesses thereabout; and a re-entrant groove extending around said flange.

15. As an article of manufacture, a molded epoxy-reinforced laminate drum element for a drum filter comprising a cylindrical wall having a peripheral flange at one end and closed by a circular disk at the other end; a central hub portion on said disk having an opening therethrough for the reception of a driving shaft; radially disposed ribs on the outer face of said disk forming sector-shaped recesses thereabout; and a re-entrant groove extending around said flange.

References Cited in the file of this patent

UNITED STATES PATENTS

| | | |
|---|---|---|
| 1,348,036 | Mount | July 27, 1920 |
| 2,472,248 | Cox | June 7, 1949 |
| 2,765,085 | Strindlund | Oct. 2, 1956 |

UNITED STATES PATENT OFFICE
CERTIFICATE OF CORRECTION

Patent No. 3,013,666 December 19, 1961

John E. Krynski

It is hereby certified that error appears in the above numbered patent requiring correction and that the said Letters Patent should read as corrected below.

Column 4, line 67, for "in" read -- on --; column 6, line 28, strike out "and".

Signed and sealed this 15th day of May 1962.

(SEAL)
Attest:

ERNEST W. SWIDER
Attesting Officer

DAVID L. LADD
Commissioner of Patents